United States Patent
Giallorenzi et al.

(10) Patent No.: US 11,988,765 B2
(45) Date of Patent: May 21, 2024

(54) OPPORTUNISTIC ADJUSTABLE RATE CROSS-AMBIGUITY FUNCTION GEOLOCATION

(71) Applicant: L3Harris Technologies, Inc., Melbourne, FL (US)

(72) Inventors: Thomas R. Giallorenzi, Sandy, UT (US); Radivoje Zarubica, Sandy, UT (US); N. Thomas Nelson, Spanish Fork, UT (US); Philip M. Hirz, Holladay, UT (US); Andrew L Nelson, Salt Lake City, UT (US)

(73) Assignee: L3HARRIS TECHNOLOGIES, INC., Melbourne, FL (US)

(*) Notice: Subject to any disclaimer, the term of this patent is extended or adjusted under 35 U.S.C. 154(b) by 515 days.

(21) Appl. No.: 17/224,740

(22) Filed: Apr. 7, 2021

(65) Prior Publication Data
US 2021/0223353 A1    Jul. 22, 2021

Related U.S. Application Data

(63) Continuation of application No. 16/130,534, filed on Sep. 13, 2018, now Pat. No. 11,022,670.

(51) Int. Cl.
*G01S 5/02* (2010.01)
*H04B 17/27* (2015.01)
(Continued)

(52) U.S. Cl.
CPC .......... *G01S 5/0273* (2013.01); *G01S 5/0242* (2013.01); *H04B 17/27* (2015.01); *H04W 4/029* (2018.02); *H04W 64/006* (2013.01)

(58) Field of Classification Search
CPC ..... G01S 5/0273; G01S 5/0242; H04B 17/27; H04W 4/029; H04W 64/006
(Continued)

(56) References Cited

U.S. PATENT DOCUMENTS

| 6,018,312 | A | 1/2000 | Haworth |
| 9,910,132 | B2 * | 3/2018 | Ray .......................... G01S 5/06 |

(Continued)

FOREIGN PATENT DOCUMENTS

| CN | 115561793 | A | * | 1/2023 | |
| TW | 201546474 | A | * | 12/2015 | ........... G01S 13/524 |

OTHER PUBLICATIONS

Non-Final Office Action received for U.S. Appl. No. 16/130,534, dated Oct. 2, 2020.

*Primary Examiner* — Harry K Liu
(74) *Attorney, Agent, or Firm* — Workman Nydegger

(57) ABSTRACT

Methods and systems for dynamically modifying a sampling operation of a sensor. The method includes obtaining a dynamically changing transmission characteristic based on an available channel bandwidth parameter. The dynamically changing transmission characteristic includes at least one of a sample rate, a time period, or a spectral bandwidth. The method further includes updating the sampling operation of the sensor based on the dynamically changing transmission characteristic. The method further includes measuring signal energy at a location of the sensor. The method further includes sampling the signal energy using the sampling operation to obtain sampled data. The method further includes providing the sampled data to a processing entity configured to analyze the data using a dynamically updated cross-ambiguity function.

20 Claims, 4 Drawing Sheets

(51) Int. Cl.
*H04W 4/029* (2018.01)
*H04W 64/00* (2009.01)

(58) Field of Classification Search
USPC .......................................................... 342/465
See application file for complete search history.

(56) References Cited

U.S. PATENT DOCUMENTS

| | | |
|---|---|---|
| 10,578,704 B1 | 3/2020 | Fernandez et al. |
| 11,022,670 B1 | 6/2021 | Giallorenzi et al. |
| 2008/0186235 A1 | 8/2008 | Struckman et al. |
| 2009/0224957 A1 | 9/2009 | Chung et al. |
| 2009/0278733 A1 | 11/2009 | Haworth |
| 2010/0302956 A1 | 12/2010 | Haverty |
| 2017/0012810 A1 | 1/2017 | Rakib et al. |
| 2017/0089706 A1* | 3/2017 | Ribeiro .................. G06F 17/16 |
| 2017/0374572 A1 | 12/2017 | Kleinbeck et al. |
| 2019/0109906 A1* | 4/2019 | Kuo ..................... H04L 67/125 |

* cited by examiner

OPPORTUNISTIC ADJUSTABLE RATE CROSS-AMBIGUITY FUNCTION GEOLOCATION

CROSS-REFERENCE TO RELATED APPLICATIONS

This application is a Continuation of U.S. patent application Ser. No. 16/130,534 filed on Sep. 13, 2018, entitled "Opportunistic Adjustable Rate Cross-Ambiguity Function Geolocation," and which application is expressly incorporated herein by reference in its entirety.

BACKGROUND

Background and Relevant Art

Geolocation of signal sources, such as radio-frequency (RF) sources and the like, allows for the location of a signal source based on its emitted signal. Digital signal processing techniques exist that perform geolocation by analyzing sampled data. One such technique uses a cross-ambiguity function (CAF). Typical systems for performing CAF geolocation have multiple sampling platforms or sensors that gather data at the different sampling platforms or sensors. By providing the CAF with two or more sets of this sampled data, the time difference of arrival (TDOA) and frequency difference of arrival (FDOA) between the sets of sampled data can be found. The location of the signal source can be determined from the TDOA and FDOA.

While CAF can provide high-quality geolocation, one disadvantage is that CAF has high bandwidth requirements for communication between the different platforms that capture the sample data, including transmission of the sample data. When the available channel bandwidth is restricted or varies, the performance of CAF geolocation can suffer.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method for dynamically modifying a sampling operation of a sensor. The method includes obtaining a dynamically changing transmission characteristic based on an available channel bandwidth parameter. The dynamically changing transmission characteristic includes at least one of a sample rate, a time period, or a spectral bandwidth. The method further includes updating the sampling operation of the sensor based on the dynamically changing transmission characteristic. The method further includes measuring signal energy at a location of the sensor. The method further includes sampling the signal energy using the sampling operation to obtain sampled data. The method further includes providing the sampled data to a processing entity configured to analyze the data using a dynamically updated cross-ambiguity function.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

The following discussion now refers to a number of methods and method acts that may be performed, as well as a system capable of performing the methods and other operations. Although the method acts may be discussed in a certain order or illustrated in a flow chart as occurring in a particular order, no particular ordering is required unless specifically stated, or required because an act is dependent on another act being completed prior to the act being performed.

Figure 1:
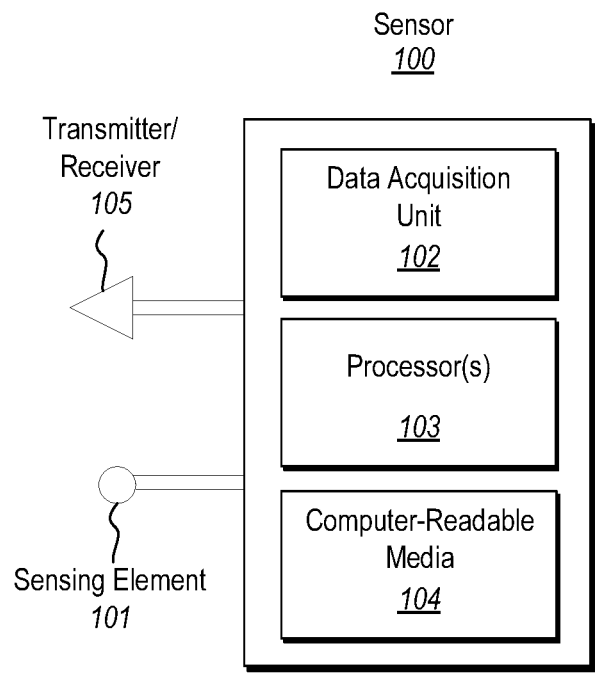
FIG. 1 illustrates a sensor device.

Referring now to FIG. 1, a sensor 100 is illustrated. In some embodiments, the sensor 100 is in a fixed position. In some embodiments, the sensor 100 is mobile or capable of being moved. For example, in some embodiments, the sensor 100 is part of a mobile device such as a smart phone, tablet, laptop, or similar devices. In other embodiments, the sensor 100 is mounted on or integrated in a drone or vehicle, such as an aircraft, boat, or car.

The sensor 100 has a sensing element 101 for measuring the environment where the sensor is located. In some embodiments, the sensing element 101 is an antenna. In some embodiments, the sensing element 101 is an element configured to measure RF energy.

The sensor 100 also has a data acquisition unit 102 for converting the sensing element 101's measurements into digital information. In some embodiments, the data acquisition unit 102 performs a sampling operation on the measurements. In some embodiments, the data acquisition unit 102 converts the measurements into spectral measurements in the frequency domain.

The sensor 100 also has processor(s) 103 and computer-readable media 104. The processor(s) 103 execute instructions on the computer-readable media 104. In some embodiments, the processor(s) 103 control the sensing element 101. In some embodiments, the processor(s) 103 control the data acquisition unit.

In some embodiments, the computer-readable media 104 contains instructions for the processor(s) 103 obtaining a dynamically changing transmission characteristic based on an available channel bandwidth parameter. In some embodiments, the dynamically changing transmission characteristic comprises at least one of a sample rate, a time period, or a spectral bandwidth. In some embodiments, the time period describes a length of time over which data are to be gathered. In some embodiments, the time period is defined by specific starting and stopping times. In some embodiments, the spectral bandwidth is one or more spectral regions over which data are to be gathered. In some embodiments, this is a defined by a first frequency and a second frequency, with the spectral bandwidth being the frequencies between the first frequency and the second frequency.

In some embodiments, the computer-readable media 104 contains instructions for the processor(s) 103 calculating or otherwise determining the dynamically changing transmission characteristic. In some embodiments, calculating the dynamically changing transmission characteristic comprises calculating or otherwise determining at least one of the sample rate, time period or spectral bandwidth. In some embodiments, obtaining the dynamically changing transmission characteristic involves receiving the dynamically changing transmission characteristic from another source, device, or system.

In some embodiments, the computer-readable media 104 contains instructions for the processors(s) 103 updating how the sensing element 101 measures the signal energy at the sensor 100. In some embodiments, the computer-readable media 104 contains instructions for the processors(s) 103 updating a sampling operation performed on the measurements. In some embodiments, updating the sampling operation comprises changing the at least one of the sample rate, the time period, or the spectral bandwidth of the sampling operation. In some embodiments, the computer-readable media 104 contains instructions for the processors(s) 103 measuring data with the sensing element 101. In some embodiments, the computer-readable media 104 contains instructions for the processors(s) 103 sampling data with the data acquisition unit 102, producing a set of sampled data comprising one or more samples.

In some embodiments, updating how the sensing element 101 measures the environment or the sampling operation is performed repeatedly or dynamically over time. In some embodiments, the updating is performed based on the dynamically changing transmission characteristic. In some embodiments, the repeated or dynamic updating changes as the dynamically changing transmission characteristic changes.

In some embodiments, the computer-readable media 104 contains instructions for the processor(s) 103 providing the measured and sampled data to a processing element configured to analyze the data using a CAF.

In some embodiments, the sensor 100 includes a transmitter/receiver 105 for transmitting and receiving data to other devices. In some embodiments, the computer-readable media 104 contains instructions for the processor(s) 103 transmitting the measured and sampled data to a processing element using the transmitter/receiver 105.

In some embodiments, the sensor 100 is configured to measure the available bandwidth between the sensor 100 and another device. In some embodiments, the computer-readable media 104 contains instructions for the processor(s) 103 making such measurements. In some embodiments, the measured available bandwidth is the available channel bandwidth parameter. In some embodiments, the available channel bandwidth parameter is provided to the sensor 100. In some embodiments, the computer-readable media 104 contains instructions for the processor(s) 103 receiving the available channel bandwidth parameter from another device using the transmitter/receiver 105.

Figure 2:
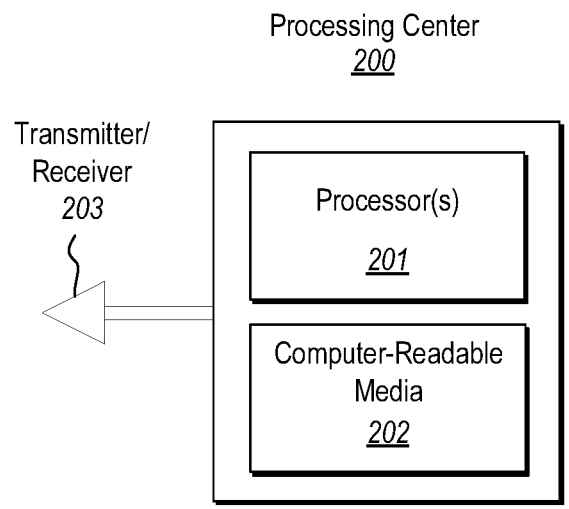
FIG. 2 illustrates a processing center.

FIG. 2 illustrates a processing center 200 for providing processing operations in a network. The processing center 200 has processor(s) 201 for executing instructions contained on computer-readable media 202. In some embodiments, the processing center has a transmitter/receiver 203.

The computer-readable media 202 contains instructions for the processors(s) 201 accessing sampled data. In some embodiments, the sampled data are multiple sets of sampled data, each sampled at a sample rate over a time period and across a spectral bandwidth. For example, the sampled data can be the data measured by a sensor 100 as described above. In some embodiments, the sampled data are accessed from memory. In some embodiments, the sampled data are received from other sources by the transmitter/receiver 203. In some embodiments, the sampled data comprises multiple sets of data, with different data sets being accessed in different ways. For example, one set of sampled data might be accessed locally from memory and other sets of sampled data might be received from other sources by the transmitter receiver 203.

The computer-readable media 202 contains instructions for the processors(s) 201 applying a CAF to sampled data of a signal to determine the location of the source of the signal. In some embodiments, the computer-readable media 202 also contains instructions for updating the CAF based on the sample rate, time period, and spectral bandwidth of one or more sets of the sampled data. In some embodiments, the sampled data are sampled at one or more sample rates, time periods, and spectral bandwidths. In some embodiments, the CAF is updated based on a dynamic transmission characteristic and the sampled data accessed by the processing center 200 is also sampled according to the dynamic transmission characteristic. In some embodiments, updating the CAF based on the dynamic transmission characteristic is performed dynamically as the dynamic transmission characteristic changes.

In some embodiments, the transmitter/receiver 203 is used to communicate with other devices. In some embodiments, those devices are part of a network with the processing element 200. In some embodiments, the transmitter/receiver 203 also provides user access to processing element 200 or a network to which processing element 200 is connected.

Figure 3:
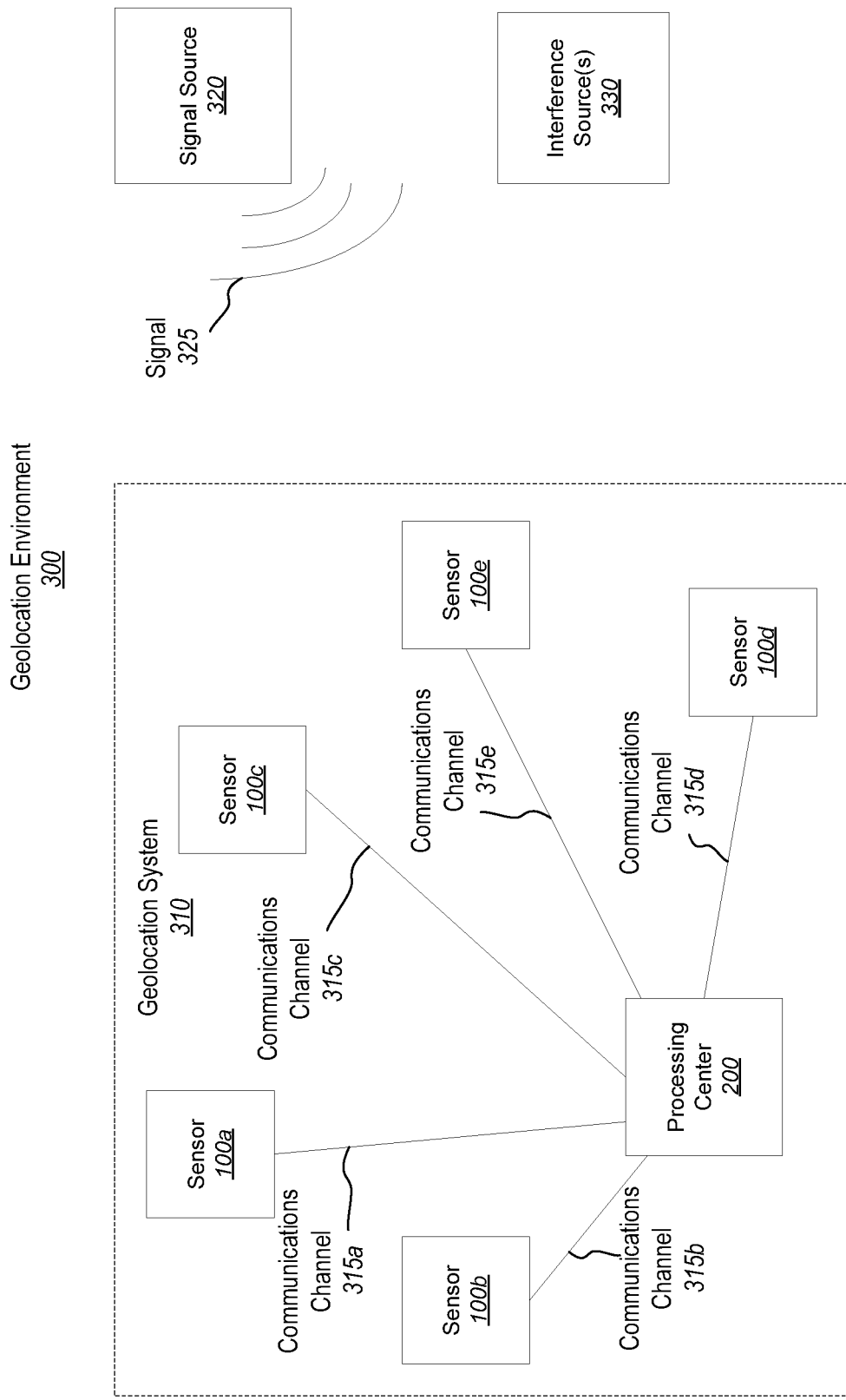
FIG. 3 illustrates a geolocation environment.

FIG. 3 illustrates a geolocation environment 300. The geolocation environment 300 shows a setting where a signal source 320 transmits a signal 325. The environment 300 also includes a geolocation system 310, which is made up of one or more sensors 100, shown as sensors 100*a*, 100*b*, 100*c*, 100*d*, and 100*e*, as well as a processing center 200. Geolocation system 310 is exemplary, but should not be seen as disclosing a requirement or limitation on the number of sensors or their physical arrangement. In some embodiments, the geolocation environment 300 also includes interference source(s) 330.

The geolocation system 310 is configured to determine the location of the signal source 320 present in the geolocation environment by measuring and sampling the signal 325 with the sensors 100*a*, 100*b*, 100*c*, 100*d*, and 100*e*, transmitting or otherwise providing that data to the processing center 200, and then applying a CAF to the sampled data in the processing center 200.

Each sensor 100a, 100b, 100c, 100d, and 100e has a channel 315a, 315b, 315c, 315d, and 315e that represents a connection between the specific sensor and the processing center 200. In some embodiments, the channel is a wireless or RF communication channel. In some embodiments, one or more of the sensors 100a, 100b, 100c, 100d, and 100e are entities in a network. In some embodiments, one or more of the sensors 100a, 100b, 100c, 100d, and 100e are integrated into, part of, or otherwise connected to network entities. In some embodiments, the network entities are part of an ad-hoc network.

In some embodiments, the processing center 200 is co-located with a sensor 100. For example, sensor 100b and processing center 200 can be directly connected or integrated. In such embodiments, the channel between the sensor 100 and the processing center 200 is a connection between the devices or within the device which both the sensor 100 and the processing center 200 are integrated. In some embodiments, the processor(s) 103 and the processor(s) 201 as described above are integrated or otherwise the same processor(s). In some embodiments, the computer-readable media 104 and computer-readable media 202 are integrated or otherwise the same computer-readable media.

In some embodiments, the processing center 200 can be moved amongst the sensors 100a, 100b, 100c, 100d, and 100e. In some embodiments, the processing center movement is achieved through software. For example, as discussed above, the processors and computer-readable media may be common between the processing center and the sensors or the sensor may be integrated into a device with other resources capable of performing the processing center 200 functions.

In some embodiments, the processing center 200 is moved based on the bandwidth available in the communications channels 315a, 315b, 315c, 315d, and 315e. In some embodiments, the processing center 200 is moved to improve the bandwidth available in channels 315a, 315b, 315c, 315d, and 315e. For example, the processing center 200 might be moved to a sensor such that the minimum bandwidth among all the channels 315a, 315b, 315c, 315d, and 315e is maximized.

The geolocation system 310 works by measuring the signal 325 at the sensors 100a, 100b, 100c, 100d, and 100e. As described above for sensor 100, the signal 325 is measured, sampled at a sample rate over a time period and across a spectral bandwidth. Each of the sensors 100a, 100b, 100c, 100d, and 100e measures and samples such that there is at least one sample or set of samples that overlap in the time period over and spectral bandwidth across which the samples were gathered. In some embodiments, the sampled data from each of the sensors 100a, 100b, 100c, 100d, and 100e exactly overlap. For example, each set of sampled data begins at the same first time and first spectral frequency and ends at the same second time and second spectral frequency. In other embodiments, the sampled data from each of the sensor 100a, 100b, 100c, 100d, and 100e only partially overlap. For example, each set of sampled data includes data sampled over a time period and across a spectral bandwidth, but one or more sets of the sampled data also include data sampled outside of the time period and spectral bandwidth.

After measuring and sampling the signal 325, the sensors 100a, 100b, 100c, 100d, and 100e provide sets of sampled data to the processing center 200 using the corresponding communications channel 315a, 315b, 315c, 315d, or 315e. In some embodiments, the communications channel 315a, 315b, 315c, 315d, or 315e is a wireless or RF communications channel. In some embodiments, the communications channel 315a, 315b, 315c, 315d, or 315e corresponds to a local memory access, such as reading data from computer-readable media 104 or 202.

The processing center 200 uses a CAF on the sampled data to determine a TDOA and FDOA between two or more of the sets of sampled data. This can then be used to determine the location of the signal source.

As discussed above for sensor 100, the sensors 100a, 100b, 100c, 100d, and 100e of the geolocation system 310 can be fixed, stationary, or mobile. Likewise, processing center 200 can be fixed, stationary, or mobile. In some embodiments, the sensors 100a, 100b, 100c, 100d, and 100e form an ad hoc network. While FIG. 3 shows signal source 320 and interference source(s) 330 as somewhat external to the geolocation system 310, due to the distributed and possibly mobile nature of the sensors 100a, 100b, 100c, 100d, and 100e, as well as processing center 200, the signal source 320 or interference sources 330 may in fact be physically located between or among the elements of the geolocation system 310. Nothing in FIG. 3 should be seen as limiting the relative physical locations of the signal source 320, the interference source(s) 330, and the geolocation system 310 with respect to one another.

Due to the physics of the actual geolocation environment 300, including the impact of interference source(s) 330, in some embodiments, the available bandwidth and other properties of one or more of the communications channels 315a, 315b, 315c, 315d, and 315e change with time. As was discussed above and as will be discussed further in the methods below, the geolocation system 310 is configured to dynamically update the sensing operations performed by sensors 100a, 100b, 100c, 100d, and 100e and geolocation calculations performed by the processing center 200. In some embodiments, calculations are performed at a central location to determine how to dynamically update the geolocation system 310. For example, in some embodiments, the processing center 200 performs the calculations. In other embodiments, the calculations may be performed externally and be provided to the geolocation system 310. In some embodiments, the calculations are performed in a variety of locations. For example, in some embodiments, each of the sensors 100a, 100b, 100c, 100d, and 100e performs part of the calculations, while the processing center 200 performs the remainder.

Figure 4:
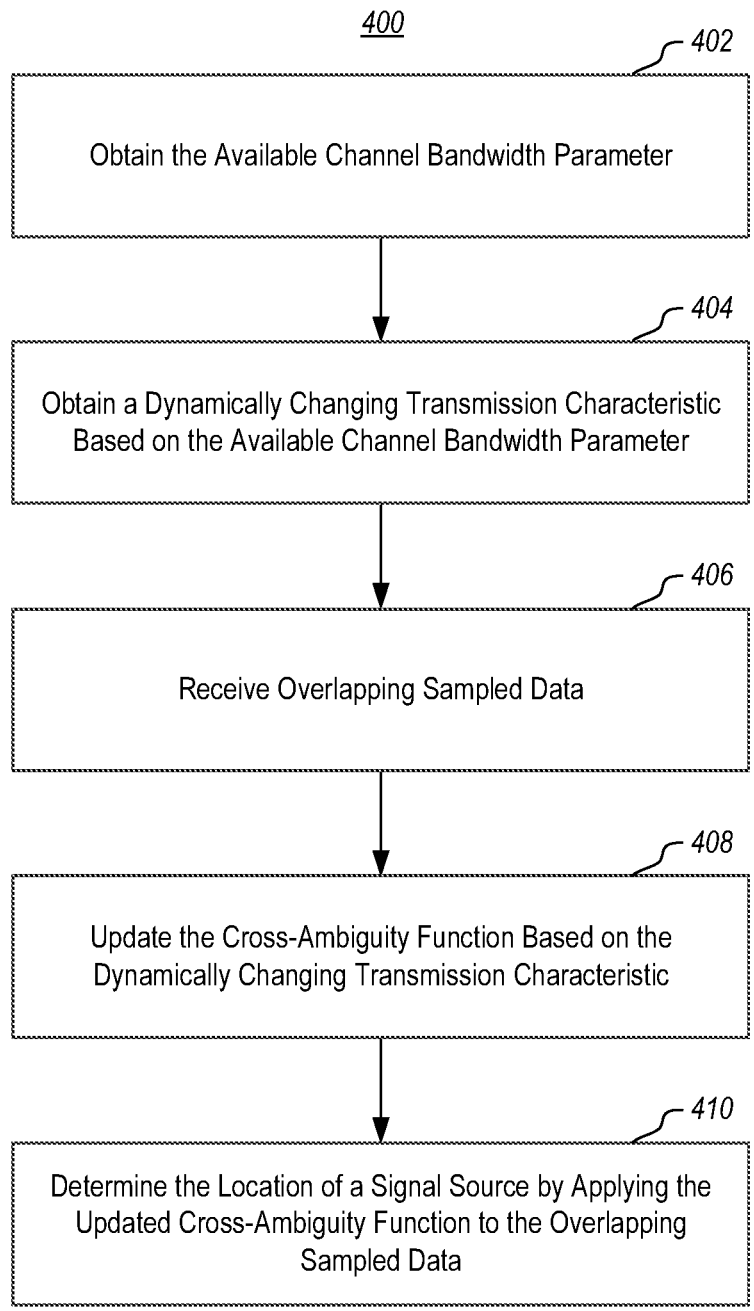
FIG. 4 illustrates a method for dynamically updating a CAF and determining the location of a signal source.

FIG. 4 illustrates a geolocation method 400 for determining the location of a signal source. In some embodiments, the geolocation method 400 is performed by the geolocation system 310 depicted in FIG. 3. In some embodiments, the geolocation method 400 is applied dynamically or repeatedly to adjust portions of the geolocation system 310 of FIG. 3 to account for changes in the communications channels 315a, 315b, 315c, 315d, or 315e. For example, referring again to FIG. 3, if one or more of sensors 100a, 100b, 100c, 100d, and 100e moves or interference source(s) 330 is/are time varying, the channel parameters, including available bandwidth, may vary. By applying geolocation method 400 at different times, the geolocation method is updated to account for changes in the channel. In some embodiments, different times mean a periodic occurrence, such as every second or after every time period of a sampling operation. In some embodiments, different times are determined by measuring or detecting changes in communications channels 315a, 315b, 315c, 315d, and 315e depicted in FIG. 3.

The geolocation method 400 includes obtaining the available channel bandwidth parameter (Act 402). In some embodiments, this is performed by measuring an available channel bandwidth between a sensor 100 and a processing center 200. For example, referring to FIG. 3, in some embodiments, the channel bandwidth available in communications channels 315a, 315b, 315c, 315d, and 315e are measured to find the available channel bandwidth between sensors 100a, 100b, 100c, 100d, and 100e and processing center 200. In some embodiments, the available channel bandwidth parameter is the bandwidth in more than one of these channels. For example, in the geolocation system 310 shown in FIG. 3, in some embodiments, the available channel bandwidth parameter is the available channel bandwidths in all of the communications channels 315a, 315b, 315c, 315d, and 315e. In some embodiments, sensors 100a, 100b, 100c, 100d, and 100e measure the available channel bandwidth. In some embodiments, the processing center measures the available channel bandwidth.

In some embodiments, the available channel bandwidth parameter is received from an external source. For example, in some embodiments, a user selects a value for the available channel bandwidth parameter. In some embodiments, the available channel bandwidth parameter is calculated. For example, in the geolocation system 310 shown in FIG. 3, when the bandwidth in the communications channels 315a, 315b, 315c, 315d, and 315e is measured or provided, in some embodiments, the available channel bandwidth parameter is calculated as a value based on those bandwidths, such as the minimum bandwidth of all the bandwidths.

In some embodiments, the available channel bandwidth parameter includes other values, such as a spectral target band. The spectral target band is bandwidth in which a signal of interest is or is expected to be located. In some embodiments, the available channel bandwidth includes a target time period, which is a time period over which a signal of interest is to be measured.

Geolocation method 400 further includes obtaining a dynamically changing transmission characteristic based on the available channel bandwidth parameter (Act 404). In some embodiments, the dynamically changing transmission characteristic is at least one of a sample rate, a time period, or a spectral bandwidth. In some embodiments, the dynamically changing transmission characteristic is obtained by selecting at least one of a sample rate, a time period for sampling, or a spectral bandwidth over which to sample such that a data transmission rate can be maintained when transmitting the sampled data. For example, for a fixed sample rate and spectral bandwidth, a certain time period over which samples are gathered is required to maintain a predetermined transmission rate in a channel between two devices, such as sensor 100a and processing center 200 depicted in FIG. 3. Based on the available channel bandwidth parameter, a certain value for time period is selected.

In some embodiments, the dynamically changing transmission characteristic uses the available channel bandwidth parameter to determine the spectral bandwidth over which to measure data. For example, in embodiments where the available channel bandwidth parameter includes a spectral target band, the spectral bandwidth chosen for the dynamically changing transmission characteristic is chosen to include at least a part of the spectral target band.

In some embodiments, the dynamically changing transmission characteristic uses the available channel bandwidth parameter to determine the time period over which to measure data. For example, in embodiments where the available channel bandwidth parameter includes a target time period, the time period chosen for the dynamically changing transmission characteristic is chosen to include at least a part of the target time period.

Geolocation method 400 further includes receiving overlapping sampled data (Act 406). In some embodiments, the sampled data are transmitted by a plurality of sensors, such as sensors 100a, 100b, 100c, 100d, and 100e depicted in FIG. 3. More than one set of the sampled data provided by the plurality of sensors include at least a part of a signal of interest emitted by a signal source, such as signal 325 emitted by signal source 320 depicted in FIG. 3. Each sensor provides a set of sampled data that includes one or more samples gathered at a sample rate over a time period and across a spectral bandwidth. Each set of sampled data overlaps in time period and spectral bandwidth such that each set of sampled data includes or spans common values. In some embodiments, the sets of sample data overlap completely. In some embodiments, this means that all of the sets of sample data include sample points in the exact same time period and spectral bandwidth, although not necessarily at the same sample rate. In some embodiments, each set of sample data is sampled with the same sample rate over the same time period and across the same spectral bandwidth.

In some embodiments, geolocation method 400 also includes providing the dynamically changing transmission characteristic to the plurality of sensors. In some embodiments, the dynamically changing transmission characteristic is provided to the plurality of sensors so that the plurality of sensors can update their sampling operation and provide sampled data that is sampled based on the dynamically changing transmission characteristic. In some embodiments, the sensors update their sampling operation and provide the sampled data according to sampling operation update method 500, described below.

Geolocation method 400 also includes updating a CAF based on the dynamically changing transmission characteristic (Act 408). In some embodiments, this involves updating the CAF to analyze based on at least one sample rate, at least one time period, and at least one spectral bandwidth contained in or determined from the dynamically changing transmission characteristic.

In some embodiments, the sets of sampled data received in act 406 are sampled at the same at least one sample rate over the same at least one time period and across the same at least one spectral bandwidth as those used to update the CAF. For example, if the CAF is updated to analyze using a first sample rate, a second sample rate, a first time period, a second time period, a first spectral bandwidth, and a second spectral bandwidth, a first set of sampled data are sampled at the first sample rate over the first time period and across the first spectral bandwidth and a second set of sampled data are sampled at the second sample rate over the second time period and across the second spectral bandwidth.

In some embodiments, at least one set of sampled data received in act 406 is sampled at a first sample rate over a first time period and across a first spectral bandwidth and the CAF is updated based on at least one sample rate, at least one time period, and at least one spectral bandwidth, and where further at least one of the first sample rate, first time period, or first spectral bandwidth does not match the at least one sample rate, the at least one time period, and the at least one spectral bandwidth, respectively. In some embodiments, the at least one set of sampled data is modified to change at least one of the first sample rate, the first time period, or the first spectral bandwidth. In some embodiments, the at least one set of sampled data is modified such that it can be analyzed in the CAF. For example, in some embodiments, if the first sample rate of the at least one set of sampled data does not match the at least one sample rate, the at least one set of sample data is upsampled or downsampled to match one of the at least one sample rates used by the CAF.

The geolocation method 400 further includes determining the location of a signal source by applying the updated CAF to the overlapping sample data (Act 410). In some embodiments, this is performed on two or more sets of sample data that overlap in the time period and spectral bandwidth over which the samples were gathered. In some embodiments, the CAF is applied to different sets of sampled data in separate operations and the results are combined or compared to determine the location of the signal source. In some embodiments, CAF is performed on all the sets of sampled data at once.

Figure 5:
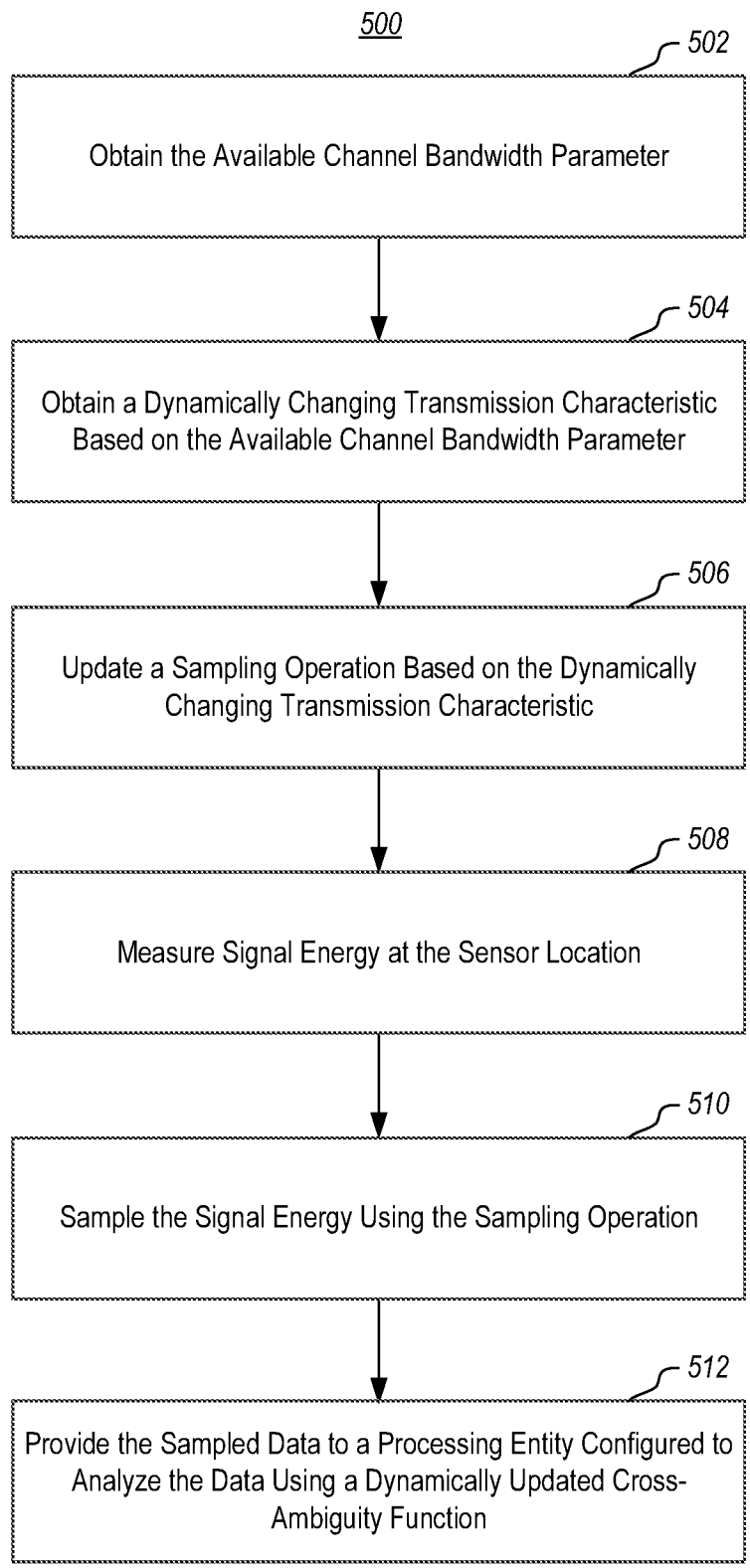
FIG. 5 illustrates a method for dynamically updating a sampling operation in a sensor.

FIG. 5 illustrates a sampling operation update method 500 for updating the sampling operation of a sensor, measuring data, and sampling the measurements using the updated sampling operation. In some embodiments, the method is used to update the sampling operations of sensors 100a, 100b, 100c, 100d, and 100e depicted in FIG. 3.

The sampling operation update method 500 begins by obtaining the available channel bandwidth parameter (Act 502). In some embodiments, this is performed by measuring an available channel bandwidth between a sensor 100 and a processing center 200, depicted in FIG. 3. For example, in the geolocation system 310 shown in FIG. 3, in some embodiments, the channel bandwidth available in communications channel 315a, 315b, 315c, 315d, and 315e is measured to find the available channel bandwidth between sensors 100a, 100b, 100c, 100d, and 100e and processing center 200. In some embodiments, the available channel bandwidth parameter is the bandwidth in more than one of these channels. For example, in some embodiments, the available channel bandwidth parameter is the available channel bandwidths in all of the communications channels 315a, 315b, 315c, 315d, and 315e. In some embodiments, sensors 100a, 100b, 100c, 100d, and 100e measure the available channel bandwidth. In some embodiments, another device, such as processing center 200 depicted in FIG. 3, measures the available channel bandwidth.

In some embodiments, the available channel bandwidth parameter is received from an external source. For example, in some embodiments, a user selects a value for the available channel bandwidth parameter. In some embodiments, the available channel bandwidth parameter is calculated. For example, in some embodiments, the bandwidth in the communications channels 315a, 315b, 315c, 315d, and 315e of FIG. 3 is measured or provided and the available channel bandwidth parameter is selected based on those bandwidths, such as the minimum bandwidth of all the bandwidths.

In some embodiments, the available channel bandwidth parameter includes other values, such as a spectral target band. The spectral target band is bandwidth in which a signal of interest is or is expected to be located. In some embodiments, the available channel bandwidth includes a target time period, which is a time period over which a signal of interest is to be measured.

Sampling operation update method 500 also includes obtaining a dynamically changing transmission characteristic based on the available channel bandwidth (Act 504) In some embodiments, the dynamically changing transmission characteristic is at least one of a sample rate, a time period, or a spectral bandwidth. In some embodiments, the dynamically changing transmission characteristic is obtained by selecting at least one of a sample rate, a time period for sampling, or a spectral bandwidth over which to sample such that a data transmission rate can be maintained when transmitting the sampled data. For example, for a fixed sample rate and spectral bandwidth, a certain time period over which samples are gathered is required to maintain a predetermined transmission rate in a channel between two devices, such as sensor 100a and processing center 200 depicted in FIG. 3. Based on the available channel bandwidth parameter, a certain value for time period is selected.

In some embodiments, the dynamically changing transmission characteristic uses the available channel bandwidth parameter to determine the spectral bandwidth over which to measure data. For example, in embodiments where the available channel bandwidth parameter includes a spectral target band, the spectral bandwidth chosen for the dynamically changing transmission characteristic is chosen to include at least a part of the spectral target band.

In some embodiments, the dynamically changing transmission characteristic uses the available channel bandwidth parameter to determine the time period over which to measure data. For example, in embodiments where the available channel bandwidth parameter includes a target time period, the time period chosen for the dynamically changing transmission characteristic is chosen to include at least a part of the target time period.

The sampling operation update method 500 also includes updating a sampling operation based on the dynamically changing transmission characteristic (Act 506). In some embodiments, this includes updating one or more of the parameters of a sampling operation based on the dynamically changing transmission characteristic. The parameters of the sampling operation include sample rate, time period, and spectral bandwidth. For example, when the dynamically changing transmission characteristic includes a second sample rate, updating the sampling operation includes changing the first sample rate of the sampling operation to be the second sample rate. In some embodiments, the first sample rate and second sample rate are the same. In some embodiments when the first and second sample rate are the same, updating the sampling operation includes identifying that the first and second sample rates are the same and not updating the first sample rate.

The sampling operation update method also includes measuring signal energy at the sensor location (Act 508). In some embodiments, measuring signal energy is performed by a sensor, such as sensors 100a, 100b, 100c, 100d, or 100e depicted in FIG. 3. In some embodiments, the sensor measures the RF environment at the sensor. In some embodiments, the sensor measures specific bandwidths or frequencies. In some embodiments, those specific bandwidths or frequencies are chosen based on a signal of interest, such as signal 325 depicted in FIG. 3. In some embodiments, measuring signal energy is performed over a time period, such as the time period in the sampling operation updated in act 506.

The sampling operation update method 500 further includes sampling the signal energy using the sampling operation (Act 510). In some embodiments, this involves sampling the signal energy measured in act 508. In some embodiments, the sampling operation is performed by a sensor 100 depicted in FIG. 1 or by sensors such as 100a, 100b, 100c, 100d, and 100e depicted in FIG. 3.

In some embodiments, the measuring of act 508 is performed by a sensing element 101 and the sampling operation of act 510 is performed by a data acquisition unit 102, both depicted in FIG. 1. In some embodiments, the measured signal energy is only measured by the sensing element 101 and the sensor 100 directly samples the measured signal energy according to act 510.

In some embodiments, the signal energy is sampled at a sample rate over a time period of the measured signal energy and across a spectral bandwidth of the measured signal energy, as defined in the updated sampling operation. In some embodiments, the result of the sampling is a set of sampled data that includes one or more samples.

The sampling operation update method 500 also provides sampled data to a processing entity configured to analyze the data using a dynamically updated cross-ambiguity function (Act 512). In some embodiments, act 512 is performed by a sensor, such as sensor 100 in FIG. 1 or sensors 100a, 100b, 100c, 100d, or 100e in FIG. 3. In some embodiments, the processing entity is the processing center 200 depicted in FIGS. 2 and 3. The dynamically updated CAF is updated as described in the acts of geolocation method 400 above that relate to updating a CAF.

In some embodiments, the sampled data are transmitted to the processing entity. For example, referring now to FIG. 3, in some embodiments, sensors 100a, 100b, 100c, 100d, or 100e transmit sampled data using transmitter/receiver 105 to processing center 200. In some embodiments, providing the sampled data to a processing entity is performed by storing the sampled data in computer-readable memory where the processing entity can access the sampled data. As described above, in some embodiments, a sensor 100a, 100b, 100c, 100d, or 100e and processing center 200 are integrated or directly connected such that providing the data to processing center 200 is accomplished by processing center 200 directly accessing the computer-readable memory where the sampled data are stored.

In some embodiments, sampling operation update method 500 is performed repeatedly by a sensor, such as sensor 100 in FIG. 1 or sensors 100a, 100b, 100c, 100d, and 100e in FIG. 3, to dynamically update the sampling operation over time. In some embodiments, sampling operation update method 500 is applied dynamically or repeatedly to update portions of a sampling operation to account for changes in the communications channel, such as communications channels 315a, 315b, 315c, 315d, or 315e depicted in FIG. 3. For example, referring now to FIG. 3, if one or more sensors 100a, 100b, 100c, 100d, and 100e moves or interference source(s) 330 is/are time varying, the channel parameters 315a, 315b, 315c, 315d, or 315e, including available bandwidth, may vary. By applying sampling operation update method 500 at different times, the sampling operation is updated to account for changes in the channel. In some embodiments, different times means a periodic occurrence, such as every second or after every time period of a sampling operation. In some embodiments, different times are determined by measuring or detecting changes in communications channel 315a, 315b, 315c, 315d, and 315e depicted in FIG. 3.

Returning now to FIG. 3, in some embodiments of geolocation system 310, sensors 100a, 100b, 100c, 100d, and 100e perform sampling operation update method 500. In some embodiments of geolocation system 310, processing center 200 performs geolocation method 400. In some embodiments of geolocation system 310, sensors 100a, 100b, 100c, 100d, and 100e and processing center 200 perform sampling operation update method 500 and geolocation method 400. In some embodiments, these methods are performed repeatedly over time to dynamically update the sampling operation and geolocation calculations based on changing channel parameters so that the sampling operation update method 500 is updated to match the performance needs of the CAF used in geolocation method 400.

In some embodiments, the dynamically changing transmission characteristic of geolocation method 400 and sampling operation update method 500 are the same. In some embodiments, the available channel bandwidth for sampling operation update method 500 is different for each of the sensors 100a, 100b, 100c, 100d, and 100e, resulting in a different dynamically changing transmission characteristic.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RANI and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for dynamically modifying a sampling operation of a sensor, the method comprising:
    obtaining a dynamically changing transmission characteristic based on an available channel bandwidth parameter, the dynamically changing transmission characteristic comprising at least one of a sample rate, a time period, or a spectral bandwidth;
    updating the sampling operation of the sensor based on the dynamically changing transmission characteristic;
    measuring signal energy at a location of the sensor;
    sampling the signal energy using the sampling operation to obtain sampled data;
    providing the sampled data to a processing entity configured to analyze the data using a dynamically updated cross-ambiguity function;
    wherein when the dynamically changing transmission characteristic includes a second sample rate, updating the sampling operation includes changing a first sample rate of the sampling operation to be the second sample rate;
    wherein when the dynamically changing transmission characteristic includes a second time period, updating the sampling operation includes changing a first time period of the sampling operation to be the second time period; and
    wherein when the dynamically changing transmission characteristic includes a second spectral bandwidth, updating the sampling operation includes changing a first spectral bandwidth of the sampling operation to be the second spectral bandwidth.

2. The method of claim 1, further comprising obtaining the available channel bandwidth parameter by obtaining an available bandwidth between the sensor and the processing entity configured to analyze the data using a cross-ambiguity function.

3. The method of claim 2, wherein obtaining the available bandwidth between the sensor and the processing entity configured to analyze the data using a cross-ambiguity function comprises measuring the available bandwidth.

4. The method of claim 1, further comprising obtaining the available channel bandwidth parameter by obtaining a bandwidth between a plurality of sensors and the processing entity configured to analyze the data using the dynamically updated cross-ambiguity function.

5. The method of claim 1, wherein obtaining the available channel bandwidth parameter comprises receiving a user selected value from an external source.

6. The method of claim 1, wherein obtaining the available channel bandwidth parameter comprises receiving a calculated value based on a minimum of a plurality of available bandwidths of a plurality of communication channels.

7. The method of claim 1, wherein the available channel bandwidth parameter comprises a spectral target band.

8. The method of claim 1, wherein obtaining the available channel bandwidth parameter comprises receiving a target time period of which a signal of interest is to be measured.

9. The method of claim 1, wherein the dynamically changing transmission characteristic is obtained by selecting at least one of a sample rate, a time period for sampling, or a spectral bandwidth over which to sample such that a predetermined data transmission rate can be maintained when transmitting the sampled data.

10. The method of claim 1, wherein the dynamically changing transmission characteristic uses the available channel bandwidth parameter to determine the spectral bandwidth as a bandwidth over which to measure data.

11. The method of claim 1, wherein the available channel bandwidth parameter includes a spectral target band, and wherein the spectral bandwidth is chosen for the dynamically changing transmission characteristic to include at least a part of the spectral target band.

12. The method of claim 1, wherein the dynamically changing transmission characteristic uses the available channel bandwidth parameter to determine the time period as a time period over which to measure data.

13. The method of claim 1, wherein the available channel bandwidth parameter includes a target time period, and wherein the time period for the dynamically changing transmission characteristic is chosen to include at least a part of the target time period.

14. The method of claim 1, wherein measuring signal energy at a location of the sensor measures specific bandwidths or frequencies, wherein the specific bandwidths or frequencies are chosen based on a signal of interest.

15. The method of claim 1, wherein measuring signal energy is performed over a time period, such as the time period in the sampling operation updated.

16. The method of claim 1, wherein the method is performed repeatedly by the sensor to dynamically update the sampling operation over time to account for changes in a communications channel.

17. The method of claim 16, wherein the changes in the communications channel are a result of movement of the sensor.

18. A sensor for dynamically updating a sampling operation, the sensor comprising:
- a sensing element;
- a data acquisition unit;
- one or more processors; and
- one or more computer-readable media having stored thereon instructions that are executable by the one or more processors to configure the sensor to dynamically update a sampling operation using the sensing element, including instructions that are executable to configure the sensor to perform at least the following:
  - obtain a dynamically changing transmission characteristic based on an available channel bandwidth parameter, the dynamically changing transmission characteristic comprising at least one of a sample rate, a time period, or a spectral bandwidth;
  - update the sampling operation of the sensor;
  - gather data using the updated sampling operation at the data acquisition unit;
  - provide the data to a processing element configured to analyze the data using a dynamically updated cross-ambiguity function;
  - obtain the available channel bandwidth parameter by obtaining an available bandwidth between the sensor and the processing element configured to analyze the data using a cross-ambiguity function, wherein obtaining the available bandwidth between the sensor and the processing element configured to analyze the data using a cross-ambiguity function comprises measuring the available bandwidth.

19. A non-transitory computer-readable media having stored thereon instructions that are executable by one or more processors to dynamically modify a sampling operation of a sensor, including instructions that are executable to configure the sensor to perform at least the following:
- obtain a dynamically changing transmission characteristic based on an available channel bandwidth parameter, the dynamically changing transmission characteristic comprising at least one of a sample rate, a time period, or a spectral bandwidth;
- update the sampling operation of the sensor based on the transmission characteristic;
- measure signal energy at a location of the sensor;
- sample the signal energy using the sampling operation to obtain sampled data;
- provide the sampled data to a processing entity configured to analyze the data using a dynamically updated cross-ambiguity function; and
- obtain the available channel bandwidth parameter by obtaining a bandwidth between a plurality of sensors and the processing entity configured to analyze the data using the dynamically updated cross-ambiguity function.

20. The non-transitory computer-readable media of claim 19, wherein obtaining the available channel bandwidth parameter is performed by measuring an available bandwidth.

* * * * *